March 26, 1963  H. P. BOVENKERK  3,083,080
METHOD FOR PRODUCTION OF ETCHED DIAMOND
Filed April 21, 1960
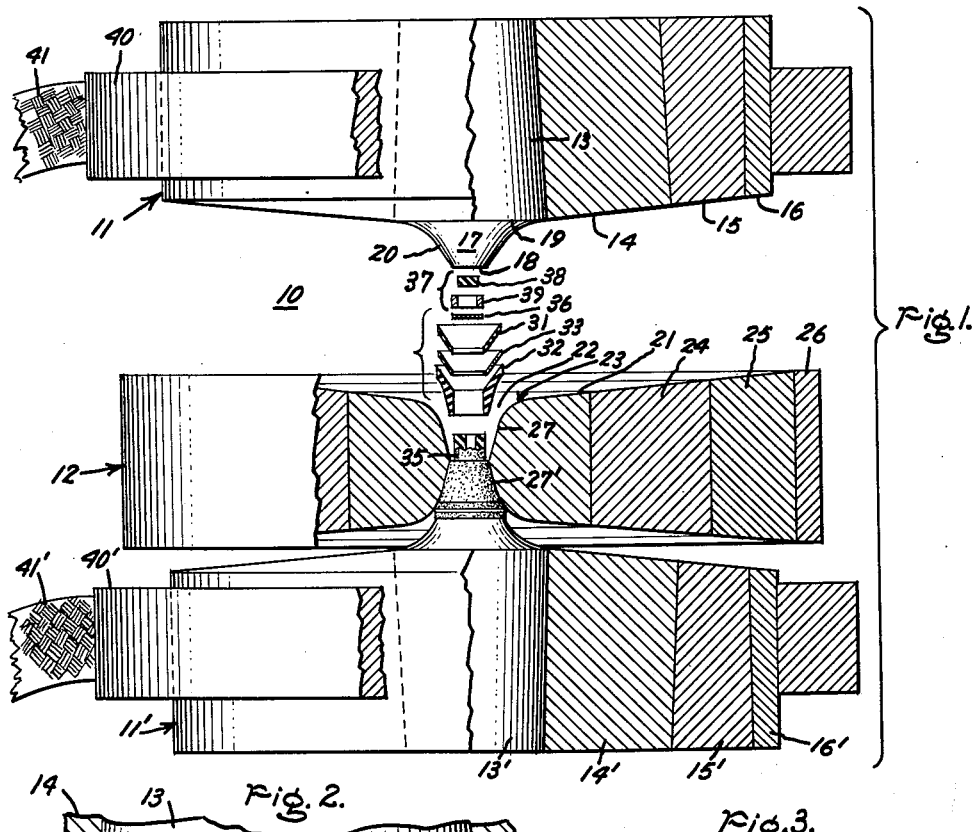
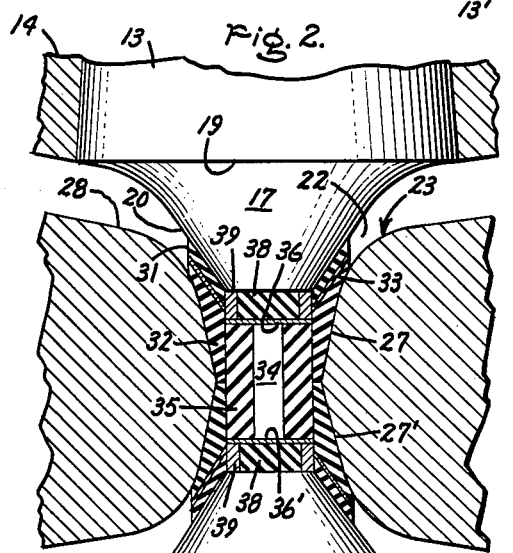
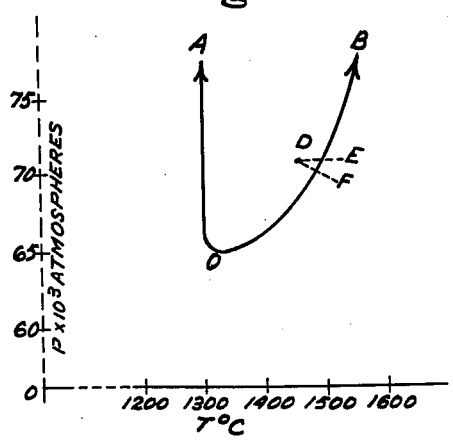
Inventor:
Harold P. Bovenkerk,
by James J. Lichiello
His Attorney.

3,083,080
Patented Mar. 26, 1963

3,083,080
METHOD FOR PRODUCTION OF ETCHED DIAMOND
Harold P. Bovenkerk, Royal Oak, Mich., assignor to General Electric Company, a corporation of New York
Filed Apr. 21, 1960, Ser. No. 23,727
7 Claims. (Cl. 23—209.1)

This invention relates to a diamond crystal having an improved gripping surface and more particularly to an etched diamond and a method for producing irregularities and/or surface changes in diamond crystal surfaces for mechanical joining purposes.

Diamonds are generally classified as of gem quality, to be utilized in the jewelery trade, or of industrial quality, which are used in various metal working and other processes requiring cutting and grinding tools of great hardness and strength. Industrial diamonds are employed as cutting and grinding elements where the diamond is mounted in a suitable tool. Well known examples of such tools may include metal cutting tools wherein a diamond is the cutting point, or grinders, dressers, saws or the like where a plurality of diamonds are joined to a metallic or non-metallic surface to provide an abrasive tool. In abrasive tool elements, including saws and grinding wheels, the initial expense of diamond is an important factor in the ultimate cost and investment. Considerable attention is paid to the problem of providing a high strength bond or joint between the diamond and the surface material in order to minimize diamond loss. In fact, once an abrasive surface deteriorates because of loss of diamond crystal, a new surface, wheel, saw, etc. is or may be required, and in most instances the original investment of the diamond is lost or substantially lost because of the difficulty in recovering diamond crystals worn from the surface.

Accordingly, it is an object of this invention to provide an improved diamond tool.

It is another object of this invention to provide a man-produced diamond having an etched surface produced in the growing process.

It is another object of this invention to provide an improved joint between a diamond particle and a tool matrix.

It is another object of this invention to provide an improved gripping surface on a diamond crystal.

It is a further object of this invention to provide greater protrusion of diamond particles from their matrix.

Briefly described, this invention includes etching man-produced diamond crystals during the growing process by raising the temperature to selectively etch the diamond crystals.

The invention will be better understood when taken in connection with the following specification and drawing in which:

FIG. 1 is an illustration of the belt-type high pressure high temperature apparatus;
FIG. 2 is an enlargement view of the center portion of the belt apparatus to show the reaction vessel; and
FIG. 3 is a curve defining one diamond growing region.

It is noted that the prior art indicates considerable effort to join diamond to a given surface, for example, a metallic surface, and such efforts have been directed, in a large part, to a particular bonding medium or braze between the diamond and the surface. Such processes include, for example, coating the diamond and effecting a bond between the coating and a given surface, and also, of embedding the diamond in a softer braze, matrix or solder which is then positioned within or attached to a harder surface. In any event, it appears that all joining mediums, in the last resort, are mechanical joints alone and that no chemical bond is indicated between the diamond and any given surface.

Diamonds utilized for abrasive surfaces or tools may be obtained from two sources, i.e., natural diamonds and man-produced diamonds. The diamonds in each instance are substantially identical in characteristics insofar as diamond characteristics are concerned. In either instance, diamonds are sold in particular mesh sizes so that the configuration of the individual particles whether natural or man-produced are generally blocky. Comparative tests between man-produced diamonds and natural diamonds when employed in a grinding wheel have indicated some differences related to the particular diamond crystal man-produced or natural, but very little difference relative to the wearing away or loss characteristics of the diamond particles from the wheel matrix.

Man-produced diamonds are now being produced in a very superior quality crystal, with reduced friability, and especially adapted to metal bonded wheels where the unit stress of the diamonds is greater. These diamonds, as now produced, are generally nearly perfectly formed octahedra. This particular shape is one of the best forms for high crystal strength. However, the smooth surfaces lead to a weak bond or joint and when used in a metal bonded wheel, for example, the overall performance of the improved crystal may not be optimized because of the poor joint.

It has been proposed that a method of producing surface roughness to provide better bonding includes etching by the use of suitable chemical actions, such as, for example, fused potassium nitrate. While this process does not introduce internal strain and defects, it remains as a further expenditure in the making of diamonds and a further and additional process.

It has been discovered that man-made diamonds may be suitably etched during the growth process in a high pressure high temperature reaction vessel. One suitable high pressure high temperature apparatus is adequately described and claimed in copending application Serial No. 707,432, Hall, filed January 6, 1958, now U.S. Patent 2,941,248, and assigned to the same assignee as the present invention, and a method for growing diamonds is adequately described and claimed in copending application Serial No. 707,435, Hall et al., filed January 6, 1958, now U.S. Patent 2,947,610, and assigned to the same assignee as the present invention. The disclosures of these patents are incorporated by reference herein.

Referring now to FIG. 1, there is illustrated what has been previously referred to as a "belt" apparatus 10. Apparatus 10 includes a pair of punch assemblies 11 and 11' together with a lateral pressure resisting or belt member assembly 12. Since the punch assemblies 11 and 11' are similar in nature a description of one suffices for the other. Punch assembly 11 includes a central punch 13 of a hard material, such as tool steel, cemented tungsten carbide etc. which is surrounded by a plurality of binding rings 14, 15 and 16. Punch 13 has a generally narrowing tapered portion 17, the taper of which is a smooth diametrical increase from the pressure area or surface 18 axially along the length of the punch to a given larger area 19. Tapered portion 17 includes an end portion 20 of frustoconical configuration with, for example, an angle of about 30° to the vertical. The term "punch" is deemed generic to pressure resisting members, for example, anvils, dies, pistons, etc.

Punch assemblies 11 and 11' are employed in conjunction with a lateral pressure resisting member or die assembly 12, comprising a die 21 having a central opening or aperture 22 therein defined by a tapered or curved wall surface 23. Wall surface 23 generally describes a narrowing tapered or convergent die chamber or opening into which punches 13 and 13' may move or progress to compress a specimen or material, for example, a reaction vessel as illustrated in FIG. 2.

In order to minimize failures, die 21 is also made of a high strength material, such as Carboloy cemented tungsten carbide similar to that of punch 13. Prestressing of die 21 may be achieved in the same manner as prestressing of punch 13, and binding rings 24, 25 and 26 are employed for purposes similar to rings 14, 15 and 16 as described. In the embodiment illustrated in FIG. 1, tapered wall 23 includes a pair of frustoconical sections 27 and 27' meeting at a horizontal center line of die 21 and having an angle at about 11° to the vertical. In order to provide motion or stroke for punches 13 and 13' to permit these punches or one of them to move into the chamber 22 to compress a reaction vessel or specimen therein, a gasket is employed between the opposed tapered surfaces of the die 23 and punch 13.

FIG. 1 provides an exploded view of a sandwich type frustoconical gasket assembly 30 which surrounds tapered surface 17 of punch 13. Gasket assembly 30 includes a pair of thermally and electrically insulating pressure resistant frustoconical ceramic or stone material gaskets 31 and 32, and an intermediate metallic gasket 33. Metallic gasket 33 is of, for example, mild steel and employed to impart cohesiveness, tensile strength and ductility to the gasket structure as a whole. Only one gasket, for example, 31 may be employed. Although specific configuration and composition of gasket assembly 30 has been described, it is obvious that any suitable gasket meeting the requirements described may be employed. A gasket may be initially placed between the punches and the die, or, alternatively may be provided by extrusion of the contents of the reaction chamber especially where the contents include a sample holder of good gasket material which extrudes into position.

One form of reaction vessel 34 is illustrated in FIG. 2. Referring now to FIG. 2, reaction vessel 34, approximately 0.350 inch in diameter and 0.450 inch in length is positioned in chamber 22 between punches 13 and 13'. Vessel 34 includes a cylinder 35 of electrically insulating material such as pyrophyllite or catlinite, talc, etc., positioned between a pair of spaced electrically conductive disks 36 and 36'. A washer assembly 37 is positioned between each punch 13 and 13' and its associated disk 36 and comprises a heat insulating core 38 with a surrounding outer electrical conductive ring 39 in contact with punches 13 and 13', to complete the reaction vessel. Rings 39 and 39' are preferably of a hard steel and together with cores 38 provide a cap assembly for reaction vessel 34 which thermally insulates the centers of the punch faces and provides a current path to the material in reaction vessel 34. The punch and die assembly of FIGS. 1 and 2 is positioned between platens or pistons of any suitable press apparatus to provide motion of one or both punches.

Each punch assembly is provided with an electrical connection (FIG. 1) in the form of an annular conducting ring 40 or 40' with connectors 41 and 41', to supply electric current from a source of electrical power (not shown) through punch assemblies 11 and 11', to a high temperature high pressure reaction vessel 34. Pressure is applied to the vessel 34 by movement of one or both punches 13 and 13' towards each other in a press apparatus. At the same time, electric current is supplied from one electrical connector, such as upper connector 41 to upper conducting ring 40 to the punch assembly 11. Referring then to FIG. 2, current flows from punch 13 to ring 39 and disk 36. From this point, current either flows through a suitable heater provided in the vessel or through the specimen itself. The current path continues from lower disk 36', ring 39' to punch 13'. Referring again to FIG. 1, the current path continues through punch assembly 11', conductor ring 40' and connector 41' to the electrical source (not shown).

The following is one specific example of a transformation of carbonaceous material to diamond as carried on in apparatus similar to that of FIG. 1.

*Example I*

The reaction vessel of FIG. 2 was assembled employing alternate small solid cylinders of commercially obtained graphite of spectroscopic purity and nickel, 99.6% nickel. The vessel was subjected to a pressure of about 90,000 atmospheres together with a temperature of about 1600° C. These conditions were maintained for about 3 minutes. After removal from the apparatus the reaction vessel was found to contain diamonds.

In the foregoing example, it is understood that various carbonaceous materials may be employed in place of the graphite and that various metal catalysts may be employed in addition to that of nickel. For example, catalysts employed have been metals of, and those metals containing, metals of group VIII of the periodic table of elements plus chromium, tantalum and manganese and other forms of carbonaceous material include, coal, pitch, tar, sugar, etc. In all instances, it is understood that compounds which decompose at high pressures and temperatures to provide the necessary carbonaceous material and/or catalyst may also be employed.

Thousands of carats of diamonds have been produced by this apparatus and similar examples, in the range upwardly of 1200° C. and 50,000 atmospheres, and are presently commercially available as man-produced diamonds. These diamonds have relatively clean and smooth surfaces, regarded as non-etched.

In the diamond growing process, diamonds are grown above the equilibrium line between diamond and graphite on the phase diagram of carbon. In FIG. 3, the area within curve AB is the diamond growing region of pressure and temperature for a particular catalyst, in this illustration, that of an alloy of 80% nickel and 20% chromium, by weight. The area outside of curve AOB is not a diamond growth region and the area generally to the right of curve AO and below curve OB represents the preferred graphite region in which etching takes place. A particular feature of the growth process is that a diamond crystal is grown within a molten metal film so that graphite diffuses or otherwise proceeds through the metal film to deposit as diamond. It has, therefore, been discovered that the reverse is also true, i.e., that the diamond itself will etch or dissolve quite rapidly in the molten catalyst metal when the graphite zone of equilibrium is reached. This is accomplished by, first growing diamonds in the usual manner within the diamond growth region for the particular catalyst, and thereafter to change pressure and/or temperature conditions to without said region but closely adjacent thereto so that portions of the diamond crystal surfaces begin to dissolve in the molten metal film surrounding the diamond. Therefore, the diamond surface is etched. The etching may, of course, be varied, i.e., the degree of etching may be controlled. Such control depends on the length of time that high temperature conditions are maintained out of the diamond stable region and the degree of temperature. The process provides etching which is quite uniform on all surfaces of a crystal. Various tests indicate this uniformity does not impair crystal strength in various cutting and grinding operations so that no particular or additional mounting problems occur. A foremost advantage is that the growth conditions are already available so that the process is economical in requiring minimum expenditures of time, apparatus and general related processes of cleaning, handling, etc. It obviates the basically uneconomical process of first growing diamonds, thereafter cleaning the diamonds and repeating almost the entire process to provide etching.

The process is best described relative to FIG. 3. Diamond growing conditions in a particular example may be represented by point D close to the graphite to diamond equilibrium line OB and within the diamond growth region of AOB. Etching of the diamond crystals, grown at point D, is accomplished by increasing the temperature to a point E which is in the graphite stable region and etching takes place. The same result may be obtained by increasing the temperature and/or lowering the pressure to a point F in the graphite stable region. Insofar as pressure and temperature is concerned either or both may be changed. During normal operation of the apparatus to grow diaminds, a constant wattage input results in a temperature increase of about 30-60°. In other words, the thermodynamic and operating characteristics of the system are such that the wattage input to provide a given temperature in a prescribed time results in a drifting of temperature past the desired point and thus normally requires a reduction in wattage input to maintain contsant temperature. The 30-60° drift is sufficient to etch diamonds in longer runs. For short runs, i.e., 2 or 3 minutes, the temperature drift is about 100-200° C., and more rapid etching takes place.

The pressure characteristics of the system is such that there is a normal pressure drop over a period of time. Therefore, when holding the temperature constant, pressure drop is sufficient to move point D to a point below OB in the graphite region. A particular feature of this etching process is that the crystal surface of a diamond etches selectively, that is, that the surface will not etch in layers but in various shaped and uniform pits and grooves with crystallographic orientation. In the process, the temperature is raised before lowering the pressure in the reaction cell and the degree and depth of the depressions can be controlled by the time and temperature level at which graphitization takes place.

Specific examples of this process as applied to diamond growth and diamond growth in a reaction vessel, are illustrated by the following examples. In each instance the apparatus illustrated in FIGS. 1 and 2 was employed. The reaction vessel was loaded with alternate slugs or disks of a carbonaceous material and a catalyst.

*Example II*

Catalyst, nickel-chromium alloy (20% Cr–80% Ni, by weight).

Carbonaceous material, high purity spectroscopic quality graphite.

Pressure, 72,000 atmospheres.

Temperature, 1320° C. and maintained about three minutes.

Temperature raised to 1570° C. and maintained for 5 minutes. Diamond crystals were removed from the reaction vessel and were noted as having all faces heavily frosted or etched.

*Example III*

Catalyst, nickel-chromium alloy (20% Cr–80% Ni, by weight).

Carbonaceous material, high purity spectroscopic quality graphite.

Pressure, 72,000 atmospheres.

Temperature, 1370° C., and maintained about 10 minutes.

Pressure lowered to 66,000 atmospheres and maintained for 10 minutes. Heavily etched crystals were obtained from the reaction vessel.

*Example IV*

Catalyst, nickel iron alloy (35% Ni–65% Fe, by weight).

Carbonaecous material, high purity spectroscopic quality graphite.

Pressure, 68,000 atmospheres.

Temperature, 1280° C.

Temperature raised to 1330° C. and maintained for 5 minutes; pressure reduced about 6,000 atmospheres simultaneously with temperature rise. Diamond crystal faces etched to a degree that they diffuse transmitted light as viewed through 20× microscope.

*Example V*

Catalyst nickel-chromium (90% Ni–10% Cr, by weight).

Carbonaceous material, high purity spectroscopic quality graphite.

Pressure, 78,000 atmospheres.

Temperature, 1380° C. initially, raised to 1550° C. during 3-minute cycle. Etched diamond crystals were removed from the reaction vessel.

Comparative wheel tests between the diamonds produced by this method and non-etched diamonds indicate a far superior joint in the etched diamond wheel. Specifically, the diamonds grown by this etching process have been placed in a wheel having Carboloy sintered tungsten carbide inserts brazed to the periphery thereof. The Carboloy cemented carbide material was sintered into final shape with the diamonds in position and without a braze or intermediate bonding medium. Tests between wheels utilizing etched diamonds and unetched diamonds show that an etched diamond wheel is superior, in that not only does the wheel wear away more slowly, but also, that a greater length of diamond crystal may protrude from the wheel without the diamond becoming dislodged. Such protrusion means better cutting and less wheel wear. Further comparison tests for the etched diamonds mounted in a circular Carboloy cemented carbide saw and employed to saw concrete also indicate the mentioned advantages. The various advantages are obtained by the joining means, i.e., that the holder material is caused to flow into or be forced into the etchings of the diamond crystal to securely lock the crystal in place. The means joining the crystal to the holder is, therefore, the portions of the holder material reaching into the etching. It is, of course, understood that the means may also include an intermediate material which will adequately cooperate with the etching and provide a suitable bond to the holder material.

It is thus understood that the objects of this invention are attained by first growing a diamond from a carbonaceous material-catalyst combination and thereafter changing the pressure temperature conditions in the reaction vessel to controllably selectively dissolve parts of the diamond surfaces into the catalyst to thereby etch the diamond.

While other modifications of this invention and variations of apparatus and methods may be employed within the scope of the invention have not been described, the invention is intended to include all such as may be embraced within the following claims.

What I claim as new and desire to secure by Letters Patent of the United States is:

1. In a diamond growing process which includes subjecting a carbonaceous material-catalyst combination to pressures and temperatures in the diamond growth region for the particular catalyst above the graphite to diamond equilibrium line on the phase diagram of carbon to cause diamond crystals to grow from said carbonaceous material, a method of etching said diamond crystals which comprises, growing diamond from a carbonaceous material-catalyst combination in said diamond growth region, changing the pressure and temperature conditions to below the graphite to diamond equilibrium line on the phase diagram of carbon with a temperature at least at the melting point of said catalyst, dissolving portions of said crystal in said catalyst, and reducing the temperature and pressure and recovering etched diamond.

2. In a diamond growing process which includes subjecting a carbonaceous material-catalyst combination to pressures and temperatures in the diamond growth region for the particular catalyst to cause diamond crystals to grow from the said carbonaceous material, a method of etching said diamond crystals which comprises raising the temperature at the end of the diamond growing process to without said diamond growth region and in the graphite stage region on the phase diagram of carbon to selectively dissolve portions of the diamond crystals into the catalyst material, reducing the temperature and pressure, and recovering etched diamond.

3. In a diamond growing process which includes subjecting a carbonaceous material-catalyst combination to pressures and temperatures in the diamond growth region of pressures and temperatures for the particular catalyst on the phase diagram of carbon to cause diamond crystals to grow from the said carbonaceous material, a method of etching said diamond crystals which comprises lowering the pressure at the end of the diamond growing process to less than pressure in the said diamond growth region, maintaining the temperature to provide molten catalyst, to selectively dissolve portions of the diamond crystals into the molten catalyst material, and reducing the temperature and pressure and recovering etched diamond.

4. In a diamond growing process which includes subjecting a carbonaceous material-catalyst combination to pressures and temperatures in the diamond growth region of the particular catalyst on the phase diagram of carbon to cause diamond crystals to grow from the said carbonaceous material, a method of etching said diamond crystals which comprises raising the temperature and lowering the pressure at the end of the diamond growing process to conditions outside of said diamond growth region with the catalyst molten to selectively dissolve portions of the diamond crystals into the catalyst material, and reducing the temperature and pressure and recovering etched diamond.

5. The invention as claimed in claim 2 wherein the temperature is raised to the range of about 50° outside of the diamond stable region.

6. The invention as claimed in claim 2 wherein the said temperature is maintained for about 5 minutes.

7. The method of providing an etched diamond crystal which comprises subjecting a carbonaceous material and a catalyst taken from the group consisting of those metals of group VIII of the periodic table of elements, chromium, tantalum and manganese, to a pressure above about 50,000 atmospheres and a temperature above about 1200° C. which is above the graphite to diamond equilibrium line on the phase diagram of carbon, maintaining said pressures and temperatures until diamond growth occurs from said carbonaceous material, thereafter changing the pressure temperature condition to a point below the said graphite to diamond equilibrium line to selectively etch said diamond crystals by dissolving portions thereof in said catalyst, reducing the temperature and pressure, and recovering the etched diamonds so formed.

References Cited in the file of this patent

UNITED STATES PATENTS

| 486,084 | Clausnitzer | Nov. 15, 1892 |
| 2,410,512 | Lindqvist et al. | Nov. 5, 1946 |
| 2,947,608 | Hall | Aug. 2, 1960 |
| 2,947,609 | Strong | Aug. 2, 1960 |

OTHER REFERENCES

Sihvonen et al.: "Chem. Abst.," 33: 6108 (1939).
Pandya et al.: "Chem. Abst.," 48: 13309, 13310 (1954).